United States Patent [19]
Zhang et al.

[11] Patent Number: 6,061,375
[45] Date of Patent: May 9, 2000

[54] LASER IRRADIATION SYSTEM AND APPLICATION THEREOF

[75] Inventors: Hongyong Zhang, Kanagawa; Shunpei Yamazaki, Tokyo, both of Japan

[73] Assignee: Semiconductor Energy Laboratory, Inc., Kanagawa-ken, Japan

[21] Appl. No.: 08/961,812

[22] Filed: Oct. 31, 1997

[30] Foreign Application Priority Data

Nov. 1, 1996 [JP] Japan ................................ 8-307425

[51] Int. Cl.[7] .................................................. H01S 3/22
[52] U.S. Cl. ...................... 372/58; 372/57; 372/82; 372/55
[58] Field of Search ........................ 372/55, 57, 24, 372/58, 59, 101

[56] References Cited

U.S. PATENT DOCUMENTS

| | | | |
|---|---|---|---|
| 3,671,882 | 6/1972 | Cool | 372/58 |
| 4,230,995 | 10/1980 | Burnham | 372/57 |
| 4,426,706 | 1/1984 | Liu et al. | 372/57 |
| 4,547,885 | 10/1985 | Allen et al. | 372/58 |
| 4,744,615 | 5/1988 | Fan et al. | 372/57 |
| 4,799,231 | 1/1989 | Smith et al. | 372/58 |
| 4,849,983 | 7/1989 | Boivineau et al. | 372/57 |
| 5,048,041 | 9/1991 | Akins et al. | 372/57 |
| 5,090,020 | 2/1992 | Bedwell | 372/57 |
| 5,373,524 | 12/1994 | Marie et al. | 372/58 |
| 5,377,215 | 12/1994 | Das et al. | 372/57 |
| 5,440,578 | 8/1995 | Sandstrom | 372/57 |
| 5,600,666 | 2/1997 | Hiiro | 372/101 |
| 5,612,967 | 3/1997 | Lai | 372/24 |
| 5,654,975 | 8/1997 | Green et al. | 372/24 |
| 5,771,258 | 6/1998 | Morton et al. | 372/57 |

*Primary Examiner*—Leon Scott, Jr.
*Attorney, Agent, or Firm*—Fish & Richardson PC

[57] ABSTRACT

Dispersion of energy density in the longitudinal direction of excimer laser shaped into a linear beam is corrected. A gas introducing system which extends in the longitudinal direction of an oscillator and which is provided with a large number of gas injecting holes is provided within the oscillator. It allows to suppress dispersion of laser oscillating positions and to suppress the dispersion of irradiation energy density within the linear laser beam.

35 Claims, 7 Drawing Sheets

IRRADIATE LASER BEAM

UPPER VIEW

SIDE VIEW

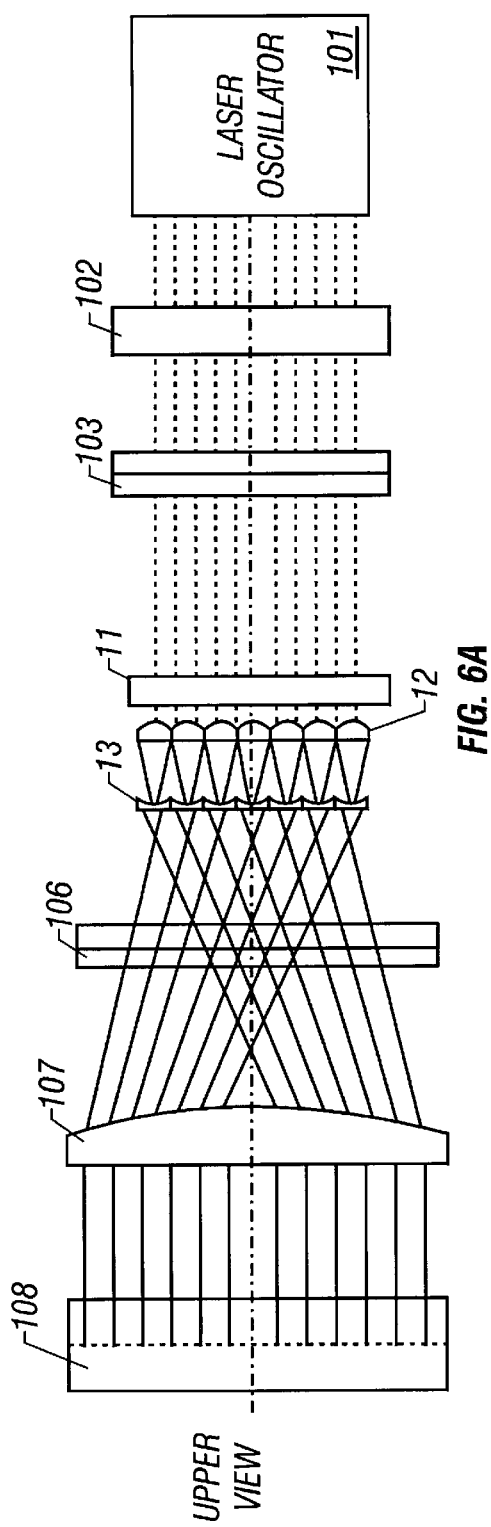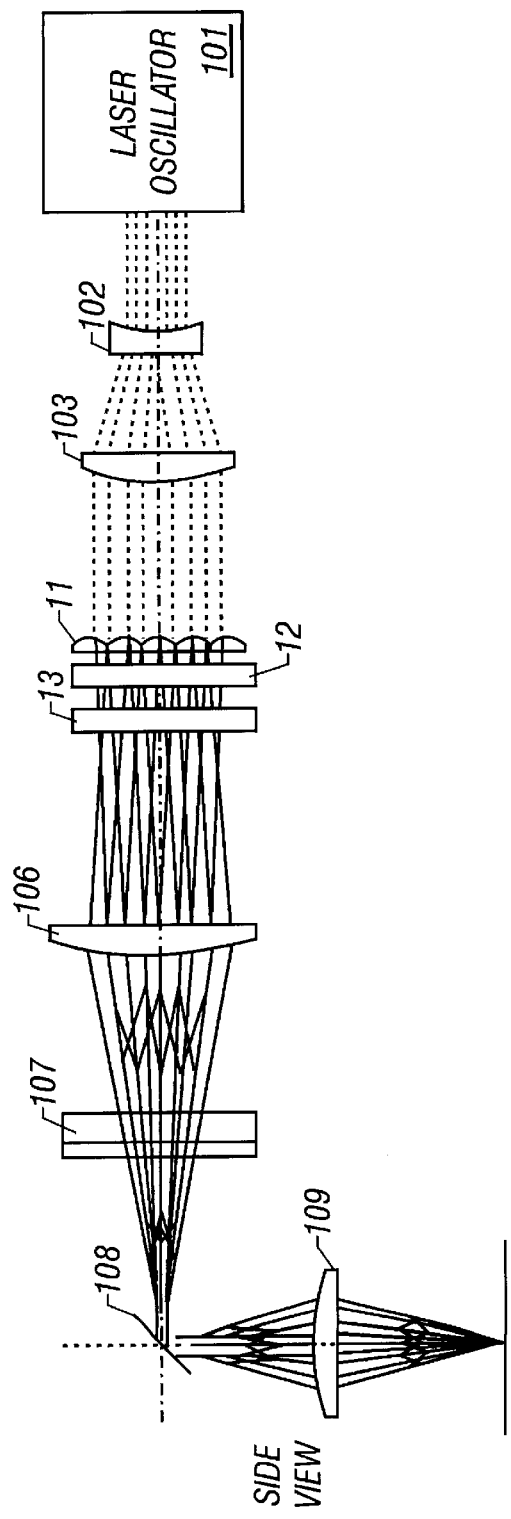

LASER IRRADIATION SYSTEM AND APPLICATION THEREOF

BACKGROUND OF THE INVENTION

Field of the Invention

The invention disclosed in the present specification relates to a laser beam irradiation system utilized in annealing a semiconductor thin film and to an application thereof.

Hitherto, there has been known a technology for annealing a semiconductor thin film in various ways by irradiating a laser beam. For example, there has been known a technology for obtaining a crystal silicon film by forming an amorphous silicon film on a glass substrate by means of plasma CVD and the like and then by irradiating thereon a pulse oscillating excimer laser beam oscillating in an ultraviolet range in fabricating a thin film transistor on the glass substrate.

The excimer laser is used because it provides an irradiation energy density and wavelength which are suitable for annealing the silicon film.

However, because the normal laser light is a spot-like beam of around several mm square, there has been a problem in terms of productivity when a glass substrate having a size of several tens cm square is used.

Then, in order to solve this problem, there has been a technology for dealing with such a large area by processing the laser beam into a linear beam of several tens cm in length by an optical system and by scanning such linear laser beam (called a linear laser).

However, there has been a problem in fabricating a thin film transistor by the method using the linear laser. A thin film transistor is fabricated not as a simplex body but as an integrated body in fabricating it. For example, when thin film transistors are to be used in an active matrix type liquid crystal display to which peripheral driving circuits are integrated, circuits which compose the peripheral driving circuits such as shift registers, buffer circuits and analog switching circuits are disposed by repeating the same circuit patterns.

When the linear laser beam is utilized to obtain such a structure, fine stripes are seen in an image on the liquid crystal display thus obtained. The stripes are categorized into two types of stripes whose longitudinal directions cross at right angles each other, i.e. into vertical and horizontal stripes.

It is noted that the vertical and horizontal stripes are seen even when the laser scanning direction is turned by 90 degrees.

The stripes are perceived as crystal non-uniformity also when a silicon film is observed after annealing.

According to the finding of the inventor, et. al., the vertical and horizontal stripes described above are related to dispersion of irradiation energy density of the linear laser beam in the longitudinal and scanning directions.

The dispersion of the irradiation energy density of the linear laser beam in the longitudinal direction is caused by dispersion of discharge starting points within the oscillator. That is, it is caused as a result of deviation of a distribution of density of the laser beam emitted from the oscillator magnified by the optical system. Because the linear laser beam is what is shaped into the beam having several mm in width and several tens cm in length from the spot beam of several cm square by the optical system, the dispersion of the discharge points within the oscillator is magnified considerably.

Then, the dispersion of the irradiation energy density of the linear laser beam in the longitudinal direction may be considered to be caused by the spatial dispersion of the oscillating positions within the laser oscillator.

In concrete, in the structure of a known prior art excimer laser oscillator shown in FIG. 1B, the oscillating positions (or more accurately, the oscillation starting positions) are dispersed in the longitudinal direction of an oscillator case per oscillation because gas is introduced from one end of the oscillator as indicated by an arrow 315.

In the structure shown in FIG. 1B, the reference numeral 311 denotes the oscillator case, discharging electrodes 312, a fan 313 driven by a motor 314, and a laser beam 316 emitted to the outside.

Even in such a structure, the spatial dispersion of the oscillating positions within the laser oscillator described above would not exert a large influence when a spot light (a circular beam or a rectangular beam whose difference of proportion of vertical length and horizontal length is small) is utilized.

That is, the influence would not be actualized as the dispersion of the irradiation energy density within the laser beam irradiated to a surface to be irradiated because the laser beam is not largely magnified and the dispersion of the oscillating positions hardly appears as the difference of irradiation energy density within the beam.

The dispersion of the irradiation energy density of the linear laser beam in the scanning direction is caused by the temporal stability of the oscillator, i.e. the dispersion of the irradiation energy density per oscillation. It may be considered to be caused by the dispersion of temporal oscillation intensity of the laser oscillator.

The dispersion of the temporal oscillation intensity of the laser oscillator may be improved considerably by optimizing a gas circulating method, an oscillation frequency and a scanning speed.

However, it has been clarified that the spatial dispersion of the laser oscillation is caused by the structure of the laser oscillator and the oscillating method thereof and that it cannot be suppressed just by optimizing the conditions.

SUMMARY OF THE INVENTION

Then, according to the invention disclosed in the present specification, it is intended to provide a technology for correcting the dispersion of the irradiation energy density of the linear laser beam in the longitudinal direction in particular to solve the inhomogeneity of effect in annealing a large area under the following presupposition:

(1) Use a pulse oscillating excimer laser;
(2) Use a linear laser beam shaped by an optical system; and
(3) A laser beam from a laser oscillator has such a fluctuation of energy density as described above.

In order to solve the aforementioned problem, according to the invention disclosed in the present specification, a laser beam irradiation system comprises an oscillator for oscillating excimer laser; an optical system for shaping the laser light from the oscillator into a linear laser beam; and means for scanning and irradiating the laser beam; and is arranged so as to supply gas which contributes in oscillating the laser homogeneously within the oscillator.

According to another invention, a laser beam irradiation system comprises an oscillator for oscillating excimer laser; an optical system for shaping the laser light from the oscillator into a linear laser beam;

and means for scanning and irradiating the laser beam; wherein gas which contributes in oscillating the laser is supplied from a plurality of locations within the oscillator.

According to a still other invention, a laser beam irradiation system comprises an oscillator for oscillating excimer laser; an optical system for shaping the laser light from the oscillator into a linear laser beam; and means for scanning and irradiating the laser beam; wherein the oscillator is arranged such that the inside thereof extends in one direction and the laser beam is taken out from one end in the direction extended in one direction; and gas which contributes in oscillating the laser is introduced at least from the one end and the other end in the extended direction within the oscillator.

According to a still other invention, a laser beam irradiation system comprises an oscillator for oscillating excimer laser; an optical system for shaping the laser light from the oscillator into a linear laser beam; and means for scanning and irradiating the laser beam; wherein the oscillator is arranged such that the inside thereof extends in one direction and the laser beam is taken out from one end in the direction extended in one direction; and gas which contributes in oscillating the laser is introduced from a plurality of locations arrayed in the extended direction within the oscillator.

According to a still other invention, a laser beam irradiation system comprises an oscillator for oscillating excimer laser; an optical system for shaping the laser light from the oscillator into a linear laser beam; and means for scanning and irradiating the laser beam; wherein the oscillator is arranged such that the inside thereof extends in one direction and the laser beam is taken out from one end in the direction extended in one direction; and gas which contributes in oscillating the laser is introduced from a plurality of locations arrayed linearly along the extended direction within the oscillator.

According to another invention, in an application of a laser beam irradiation system comprising an oscillator for oscillating excimer laser; an optical system for shaping the laser light from the oscillator into a linear laser beam; and means for scanning and irradiating the laser beam; wherein the oscillator is arranged such that the inside thereof extends in one direction and the laser beam is taken out from one end in the direction extended in one direction; and gas which contributes in oscillating the laser is introduced from a plurality of locations along the extended direction within the oscillator; a semiconductor thin film is annealed by shaping the laser beam from the oscillator into the linear beam by the optical system and by irradiating the laser beam shaped into the linear beam to the semiconductor thin film while scanning in the width direction of the linear beam.

According to a still other invention, in an application of a laser beam irradiation system comprising an oscillator for oscillating excimer laser; an optical system for shaping the laser light from the oscillator into a linear laser beam; and means for scanning and irradiating the laser beam; wherein the oscillator is arranged such that the inside thereof extends in one direction and the laser beam is taken out from one end in the direction extended in one direction; and gas which contributes in oscillating the laser is introduced from a plurality of locations along the extended direction to oscillate the laser in which spatial fluctuation has been corrected; the laser beam oscillated from the oscillator is shaped into the linear beam by the optical system for irradiation.

The specific nature of the invention, as well as other objects, uses and advantages thereof, will clearly appear from the following description and from the accompanying drawings.

BRIEF DESCRIPTION OF DRAWINGS

FIGS. 6A and 6B are schematic drawings showing an optical system; and

DESCRIPTION OF PREFERRED EMBODIMENTS

Figure 1A:
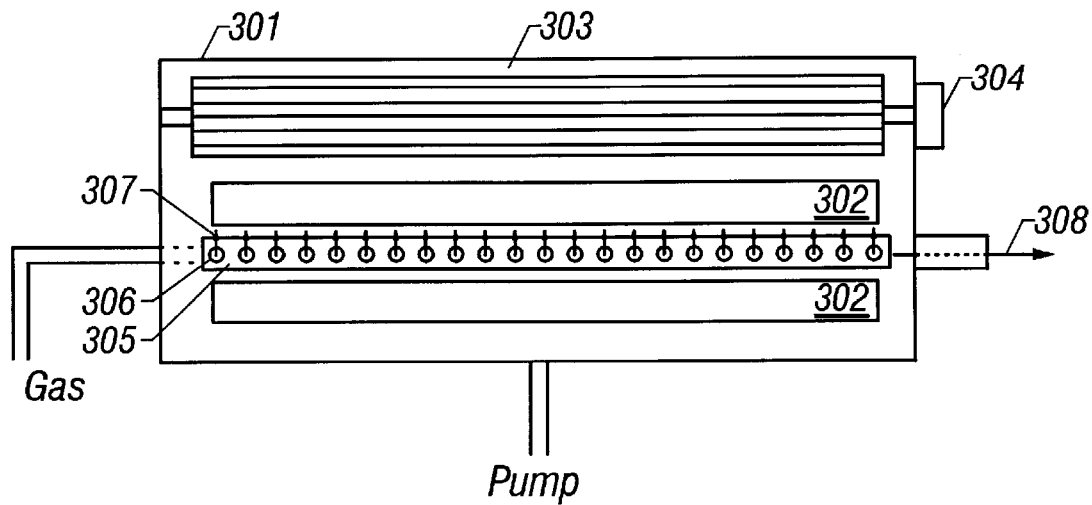
FIGS. 1A and 1B are schematic drawings showing laser oscillators.

Gases (e.g., Kr and F in case of KrF excimer laser) for oscillating the excimer laser are introduced to a laser oscillator 301 having an oscillation space extended in one direction as shown in FIG. 1A from gas introducing means 305 provided with a plurality of inlets 306 disposed in the longitudinal direction within the oscillator.

It permits to suppress the spatial fluctuation in oscillating laser within the oscillator and the dispersion of the irradiation energy density caused when the shape of the laser beam is changed by an optical system.

That is, the homogeneity of laser oscillating positions may be enhanced by supplying gases not contributing in the oscillation (non-degraded gas) homogeneously into the oscillator.

The homogeneity of the oscillation may be promoted also by introducing the gases at least from one end and the other end in the longitudinal direction of the oscillator.

However, it is preferable to adopt the gas introducing means 305 shown in FIG. 1A, i.e. the arrangement in which the gas is injected spatially homogeneously from the direction along the longitudinal direction within the extended oscillator.

[First Embodiment]

FIG. 1A schematically shows the laser oscillator. In the figure, an oscillator case 301 has a structure extended in the horizontal direction in the figure. Within the oscillator, the gas introducing means 305 for homogeneously introducing the gas is provided in the longitudinal direction of the oscillator. The plurality of inlets 306 are provided in the gas introducing means 305 along the longitudinal direction of the oscillator.

For the gas, Kr and F are used in case of a KrF excimer laser. Xe and Cl are used in case of a XeCl excimer laser. The gases are agitated in the oscillator case by a fan 303 driven by a motor 304. They are then evacuated to the outside by a pump.

Electrodes 302 cause electric discharge and laser oscillation when a high voltage high-frequency wave is applied between these electrodes 302. The oscillated laser beam is taken out to the outside as indicated by an arrow 308.

Figure 7A:
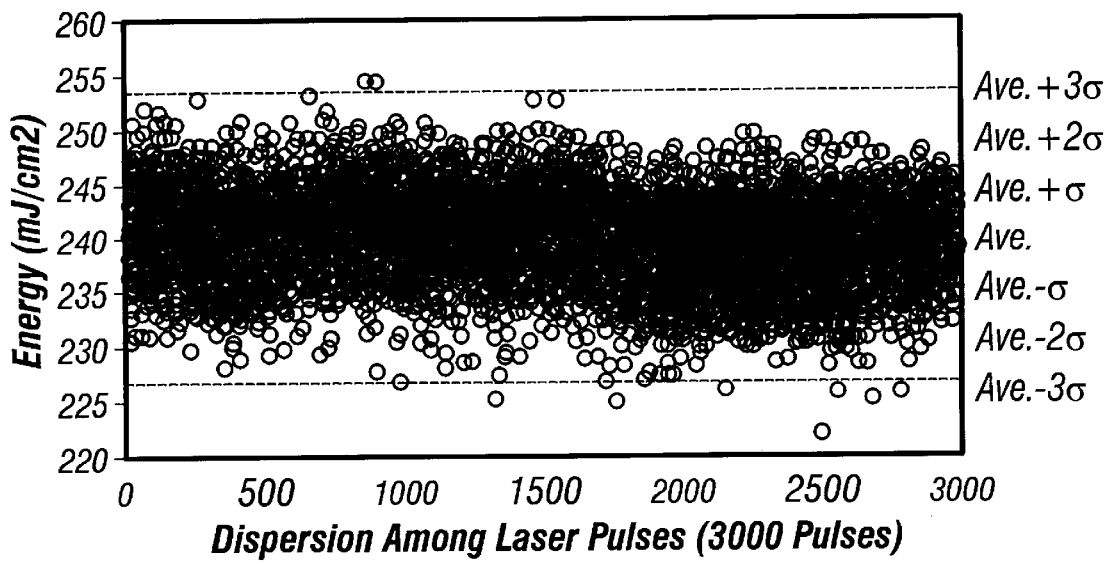
FIGS. 7A and 7B are graphs showing dispersion among laser pulses of a laser beam.
Figure 7B:
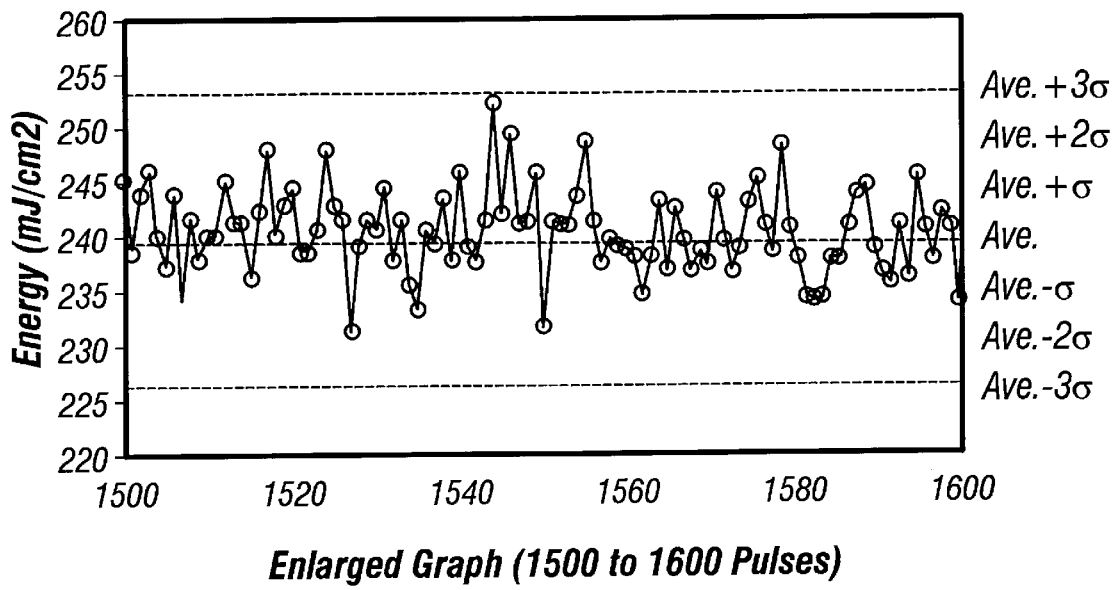

FIGS. 7A and 7b show actually measured data of the dispersion of irradiation energy density among laser pulses of the laser beam oscillated from the modified laser oscillator shown in FIG. 1A.

The followings are various parameters thereof:
Laser oscillating condition: 50 Hz, 29 kV (KrF excimer laser)
Measured Data:
Average value of energy density: 239.6 mJ/cm$^2$
Standard Deviation: 4.43
σ/Ave 1.85%
Maximum value of energy density: 254.0 mJ/cm$^2$ (6.01%)
Minimum value of energy density: 221.9 mJ/cm$^2$ (7.39%)
Average value +3σ: 252.9 mJ/cm$^2$ (2/3000)
Average value −3σ: 226.3 mJ/cm$^2$ (7/3000)
Number of samples: 3000

The scheme of the optical system will be described below. The optical system shown in FIG. 5 has a function of shaping a laser light from the oscillator into a linear beam. In FIG. 5, the laser light oscillated from an oscillator 101 is shaped into the laser beam having a predetermined shape and a predetermined distribution of energy density by the optical system comprising lenses 102 and 103.

Then, the distribution of the intra-beam energy density of the laser beam is corrected by three homogenizers 11, 12 and 13.

The homogenizer 11 plays a role of correcting the intra-beam energy density in the width direction of the laser beam to be shaped into a linear shape in the end. However, because the size of the linear laser beam in the width direction is just several mm, the role of this homogenizer 11 is not so significant. In other words, the optical parameters of the homogenizer 11 need not be set or controlled so subtly.

The homogenizers 12 and 13 play a role of correcting the intrabeam energy density in the longitudinal direction of the laser beam to be shaped into the linear shape in the end.

Because the laser beam is extended in the longitudinal direction by more than 10 cm, the optical parameters of the homogenizers 12 and 13 need to be set carefully.

Here, the two homogenizers 12 and 13 for controlling the distribution of the irradiation energy density in the longitudinal direction of the laser beam are disposed in order to homogenize further the distribution of the irradiation energy density in the longitudinal direction of the laser beam.

Lenses 106, 107 and 109 play a role of shaping the laser beam into the linear beam. That is, the lenses 106 and 109 have a function of narrowing the laser beam in the width direction. The lens 107 has a function of extending the laser beam laser longitudinally in cooperation with the two homogenizers 12 and 13.

Figure 5A:
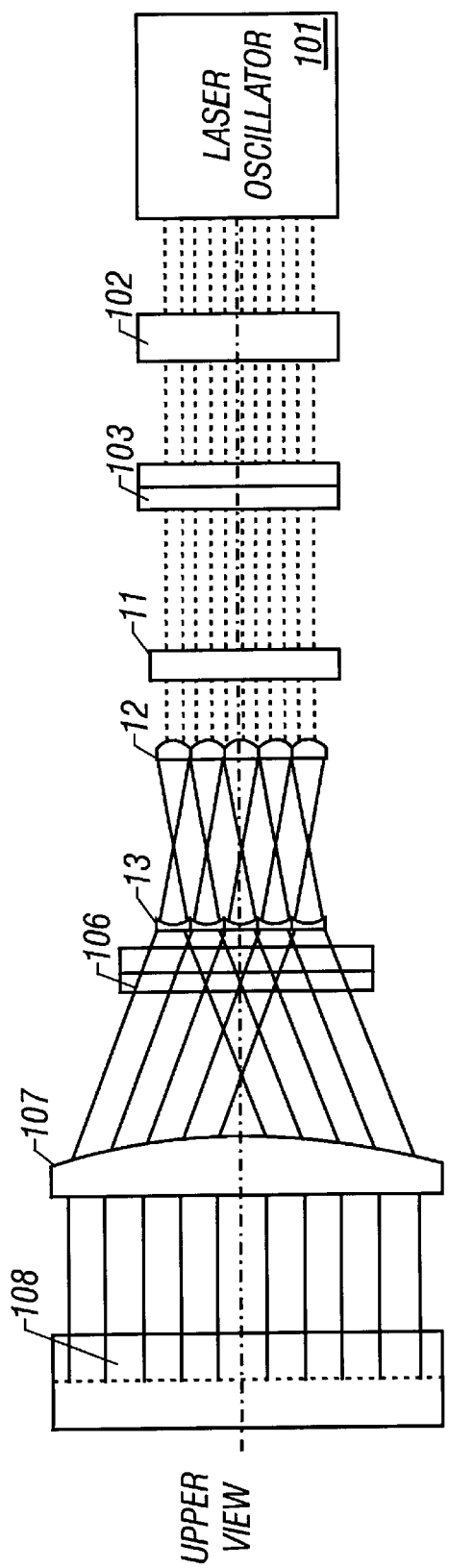
FIGS. 5A and 5B are schematic drawings showing an optical system.
Figure 5B:
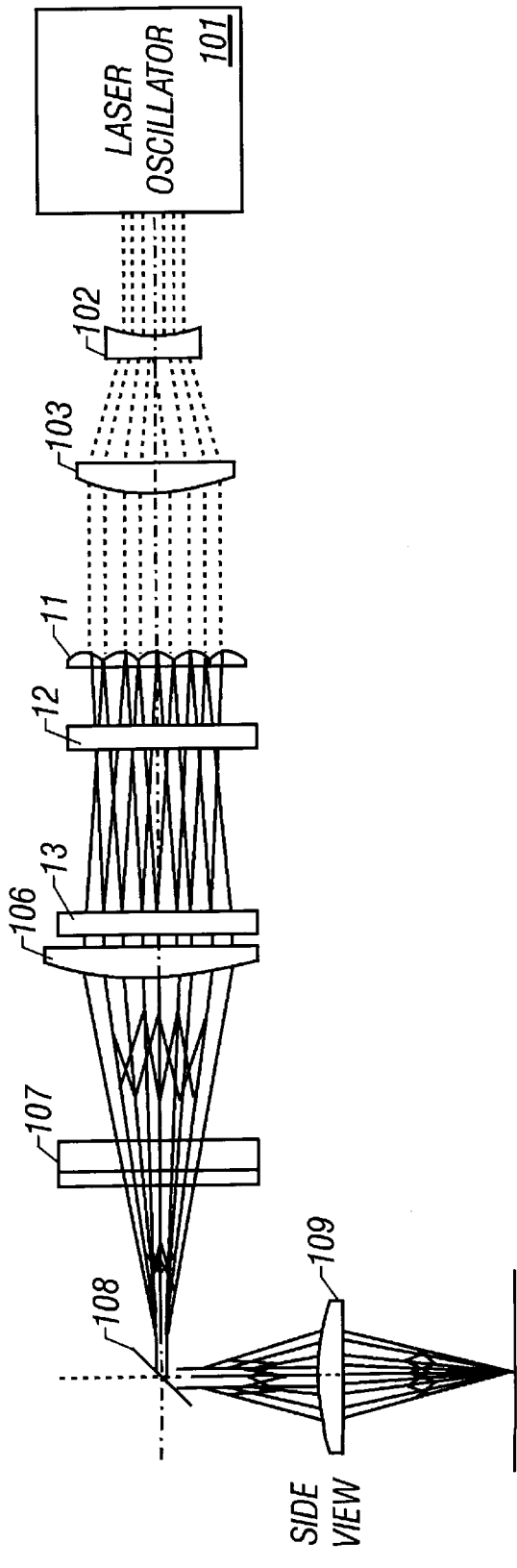

The irradiation energy density of the linearly shaped laser beam in the longitudinal direction is controlled by the two homogenizers 12 and 13 in the arrangement shown in FIGS. 5A and 5B. It is noted that the number of homogenizers may be increased further as necessary.

One homogenizer is disposed as for the width direction of the linear laser beam in which homogeneity is not required so much in this case to obtain a necessary homogeneity.

It is noted that the proportion of the width of the laser beam from the oscillator to the length of the final linear laser beam in the longitudinal direction is expressed to be smaller than the actual proportion in the figures for reasons in drawing the figures. However, the laser beam output from the oscillator is actually a spot light of less than several mm square and the length of the laser beam shaped by the optical system in the longitudinal direction is more than 10 cm.

FIGS. 6A and 6B show an exemplary arrangement of another optical system in which various optical parameters are set differently more or less, though it has basically the same structure with the optical system shown in FIGS. 5A and 5B.

Figure 1B:
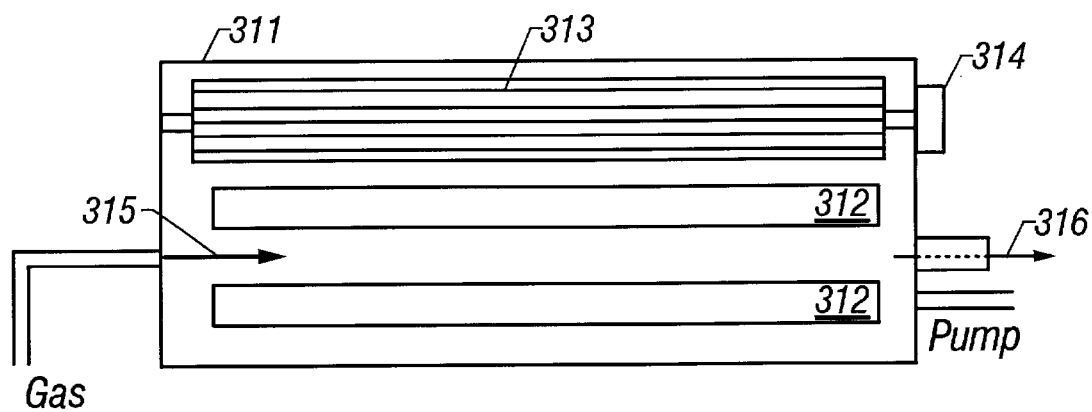

In the arrangement shown in FIGS. 6A and 6B, the positional relationship between the homogenizers 12 and 13 is different from that shown in FIGS. 5A and 5B. In this case, the setting of the optical parameters of each lens needs to be changed from that of FIG. 1 in accordance with the change of the positional relationship between the homogenizers 12 and 13.

[Second Embodiment]

Steps for fabricating an active matrix liquid crystal display to which peripheral driving circuits are integrated will be described in the present embodiment.

FIGS. 2A through 2E show the fabrication steps. At first, an underlying film not shown is formed on a glass substrate (or quartz substrate) 501. Here, a silicon oxide film is formed so as to be 3000 Å in thickness as the underlying film not shown by means of sputtering.

Figure 2A:
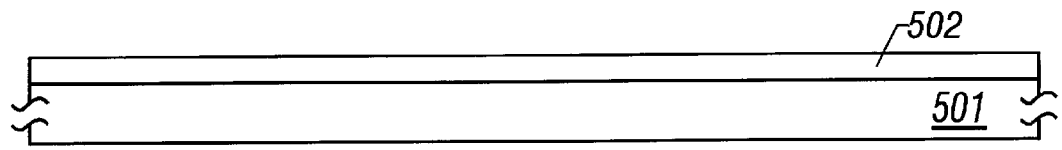
FIGS. 2A through 2E are diagrams showing steps for fabricating TFT parts of an active matrix type liquid crystal display to which peripheral driving circuits are integrated in the second embodiment.

Next, an amorphous silicon film 402 is formed so as to be 500 Å in thickness by means of plasma CVD (or reduced pressure thermal CVD). Thus, the state shown in FIG. 2A is obtained.

Then, a KrF excimer laser beam is irradiated to crystallize the amorphous silicon film 502 by utilizing the laser beam irradiation system provided with the laser oscillator and the optical system shown in the first embodiment. Thus, a crystal silicon film is obtained. After obtaining the crystal silicon film, it is patterned to form active layers 51, 52 and 53 of thin film transistors shown in FIG. 2B.

Here, the active layer 51 is that of a PTFT and the active layer 52 is that of a NTFT. A CMOS composing the peripheral driving circuit is structured by these two TFTs. The active layer 53 is that of a NTFT disposed in a picture element.

A silicon oxide film 503 which functions as a gate insulating film is formed so as to be 1000 Å in thickness by means of plasma CVD. Further, an aluminum film is formed so as to be 4000 Å in thickness by means of sputtering. It is then patterned to form gate electrodes 504, 505 and 506.

Then, anodic oxide films 507, 508 and 509 are formed to be 1000 Å in thickness by anodizing while using the pattern of the gate electrodes as the anode. The anodic oxide films have a function of protecting the gate electrodes electrically and physically. Thus, the state shown in FIG. 2B is obtained.

Although the gate electrodes are formed by using aluminum having low resistance in this example, other conductive materials may be also used.

Figure 2B:
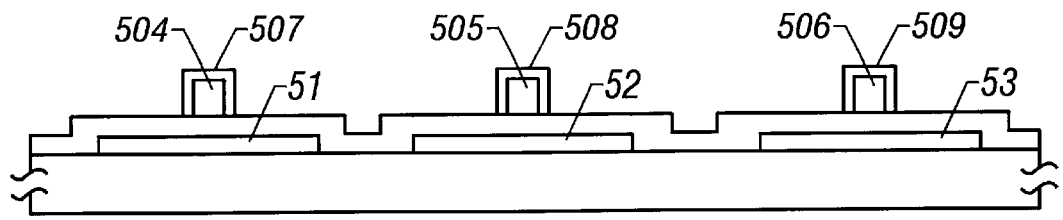

Next, impurity elements are doped to give conductive types in the state shown in FIG. 2B. Here, B (boron) is doped at first selectively to the active layer composing the PTFT by means of plasma doping and then P (phosphor) is doped selectively to the active layer composing the NTFT by means of plasma doping.

Figure 2C:
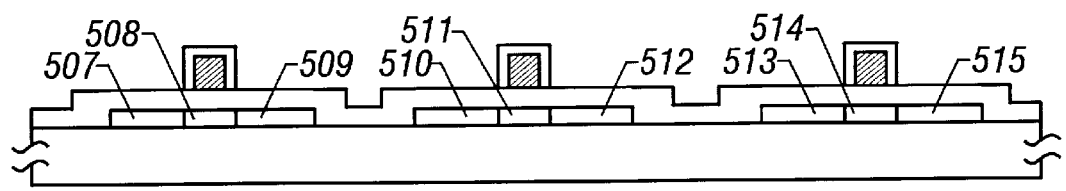

Thus, a source region 507, a channel region 508 and a drain region 509 of the PTFT composing the peripheral driving circuit are formed in a manner of self-alignment. Further, a source region 512, a channel region 511 and a drain region 510 of the NTFT composing the peripheral driving circuit are formed in a manner of self-alignment. Still more, a source region 513, a channel region 514 and a drain region 515 of the NTFT disposed in the picture element are formed in a manner of self-alignment. Thus, the state shown in FIG. 2C is obtained.

It is noted that because the anodic oxide films 507, 508 and 509 exist in the present embodiment, an offset gate region having the same thickness with them is formed between the channel region and the source/drain region. However, because its size is about 1000 Å (actually, it is considered to be even smaller since implanted ions may turn into the offset regions during the plasma doping), its existence is ignored here. It is noted that the effect of the offset gate region is actualized when the anodic oxide film is thickened to be 2000 Å or more for example.

Next, a silicon nitride film 516 having a thickness of 2000 Å and a film 517 made of polyimide resin are laminated as a first interlayer insulating film. Here, the silicon nitride film is formed by means of plasma CVD and the film made of polyimide resin is formed by means of spin coating.

Then, contact holes are created to form a source electrode 518 of the PTFT, a source electrode 520 of the NTFT and a drain electrode 519 common for the both TFTs of the peripheral driving circuit. Thus, the CMOS in which the PTFT and the NTFT are constructed complementarily is obtained.

Figure 2D:
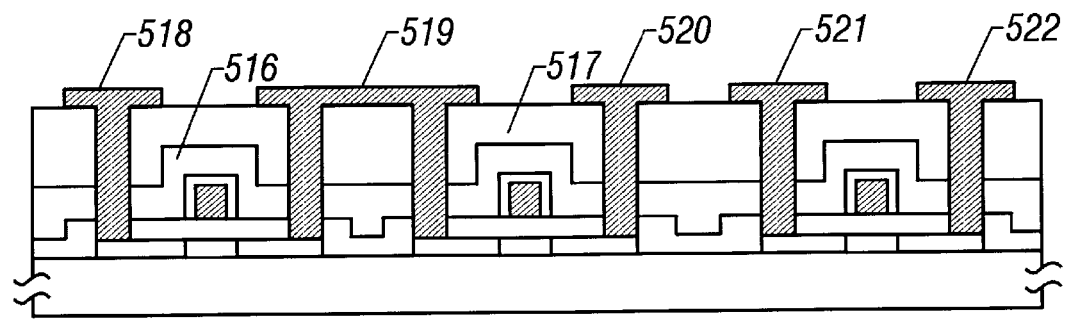

Further, a source electrode 521 and a drain electrode 522 of the NTFT disposed in the matrix of picture elements are formed. Here, the source electrode 521 is formed as what is extended from a source wire disposed in lattice in the matrix area of the picture elements together with a gate wire. Thus, the state shown in FIG. 2D is obtained.

Next, an insulating film 523 made of polyimide resin is formed as a second interlayer insulating film by means of spin coating. Then, a contact hole is created to form a pixel electrode 524 by ITO.

Figure 2E:
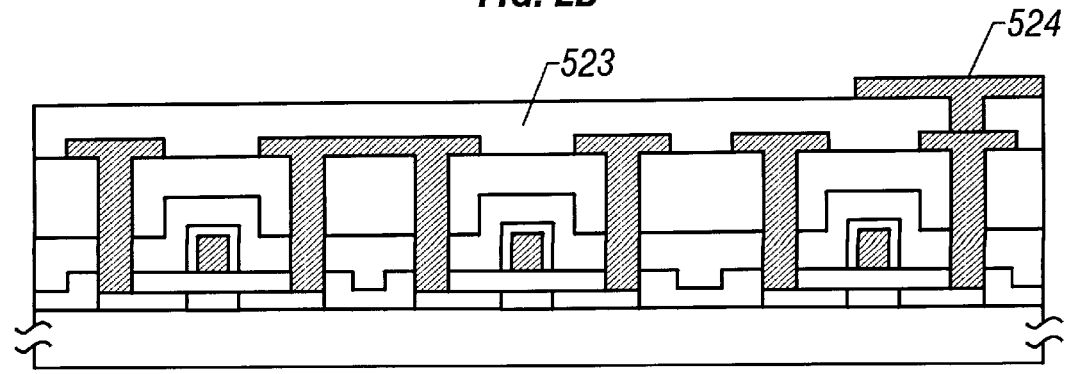

Thus, the fabrication of one of the substrates composing the active matrix type liquid crystal display in which the peripheral driving circuits and the active matrix circuit shown in FIG. 2E are integrated on the same glass substrate is completed.

It is noted that it is necessary to form an orientation film and to work out the orientation further in order to construct the liquid crystal display.

[Third Embodiment]

Figure 3A:
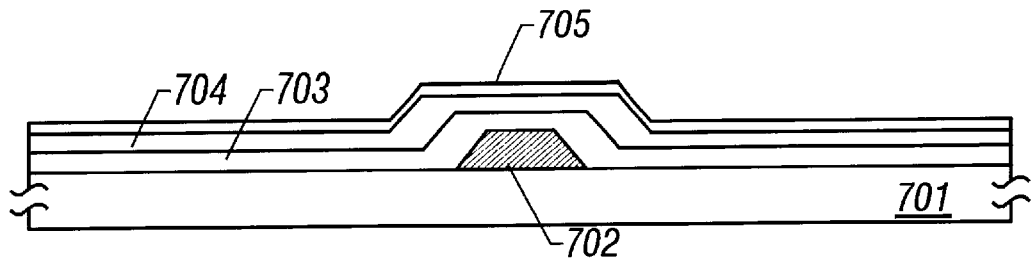
FIGS. 3A through 3D are diagrams showing steps for fabricating a thin film transistor in the fourth embodiment.

Steps for fabricating a bottom gate type thin film transistor will be described in the present embodiment. At first, a gate electrode 702 is formed on a glass substrate 701 as shown in FIG. 3A. Then, a 1o silicon oxide film 703 which functions as a gate insulating film and an amorphous silicon film 704 are formed.

After forming the amorphous silicon film 704, an impurity film 705 is formed unavoidably on the surface thereof. Thus, the state shown in FIG. 3A is obtained.

Figure 3B:
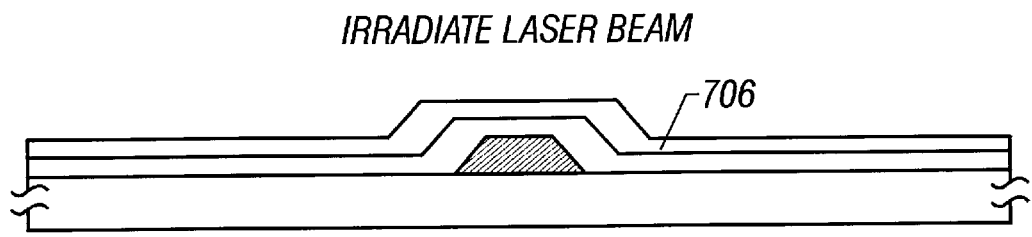

Next, the impurity film 705 is removed by etching and a laser beam is irradiated for crystallizing the amorphous silicon film 704 in order to obtain a crystal silicon film 706. Thus, the state shown in FIG. 3B is obtained.

Figure 3C:
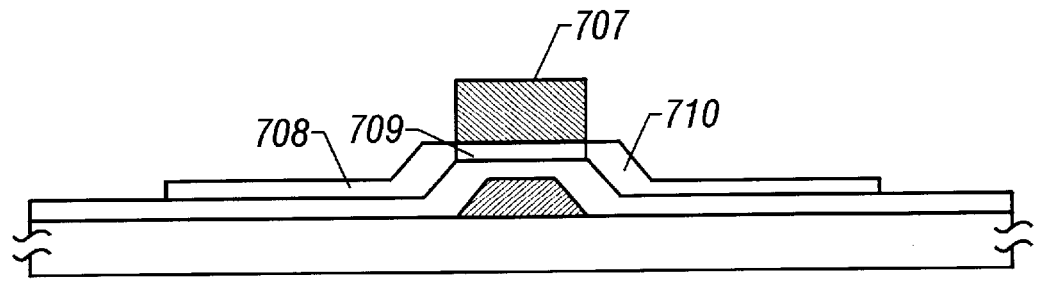

Next, a resist mask 707 is formed by exposing from the back of the substrate as shown in FIG. 3C. Then, impurities for forming a source/drain region are doped by using the resist mask 707 to form a source region 708 and a drain region 710. At this time, a channel region 709 is also defined.

After finishing the doping, the resist mask is removed and a laser beam is irradiated again. In this step, the dopant is activated and the damage during the doping is annealed.

Figure 3D:
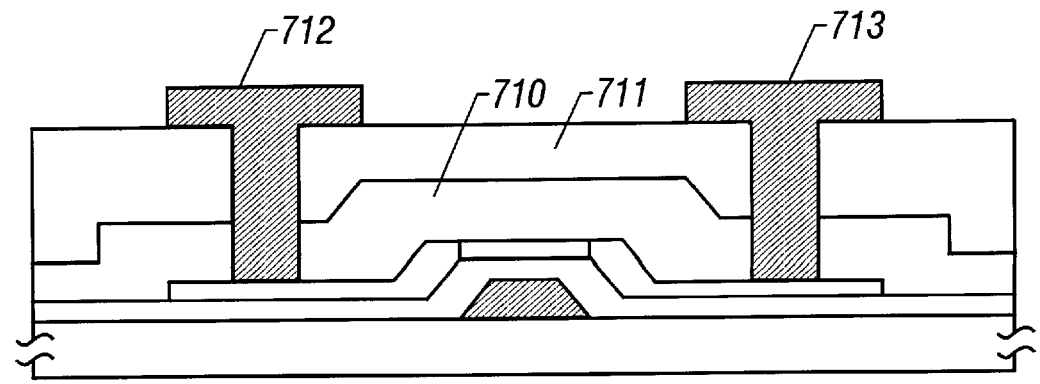

Next, a silicon nitride film 710 is formed as an interlayer insulating film and an interlayer insulating film 711 made of polyimide resin is formed as shown in FIG. 3D. Then, contact holes are created to form a source electrode 712 and a drain electrode 713. Thus, the bottom gate type thin film transistor is completed on the glass substrate.

Figure 4A:
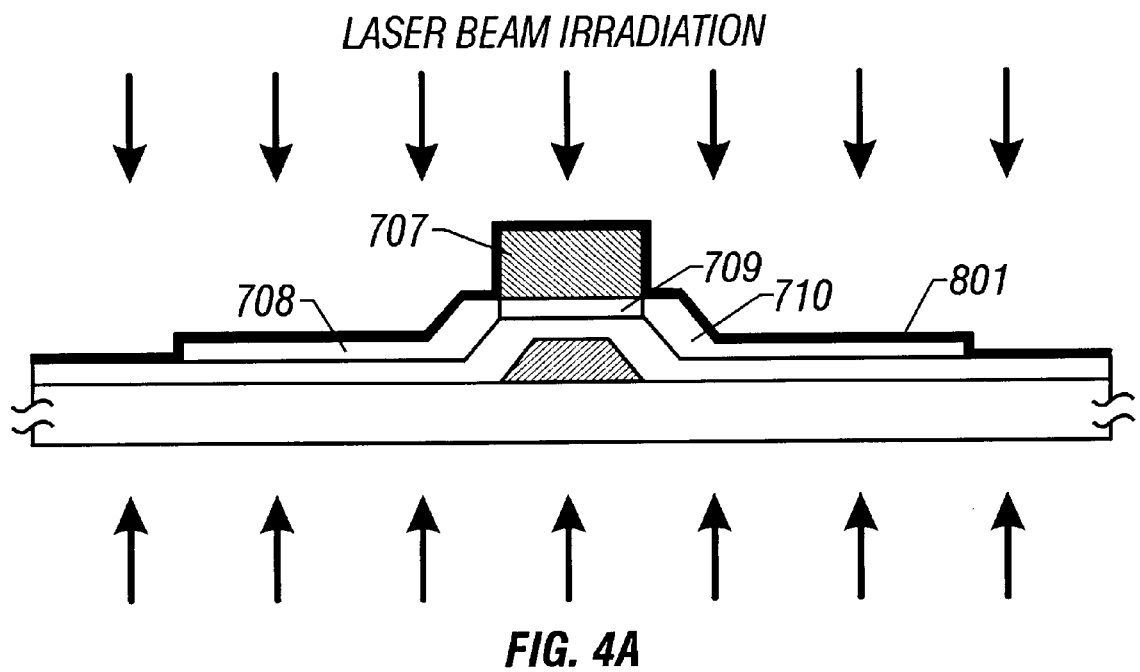
FIGS. 4A and 4B are drawings showing doping means in the fourth embodiment.
Figure 4B:
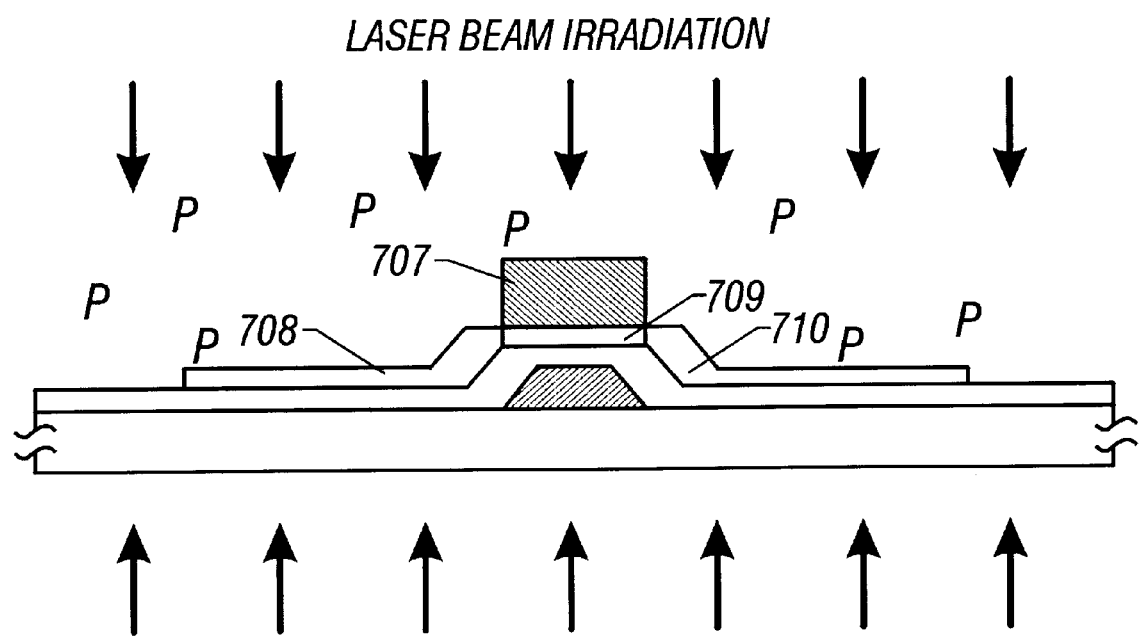

FIGS. 4A and 4B show doping methods which are different from that shown in FIG. 3C. FIG. 4A shows a method of forming a thin film 801 containing a dopant element and of then irradiating a laser beam to the substrate from the upper side or the back side of the substrate. When this method is adopted, the film melts instantly and the dopant element spreads therefrom to the region which turns out to be the source/drain region. Thus, the source/drain region having one conductive type is formed.

FIG. 4B shows a doping method of irradiating the laser beam on the surface or from the back of the substrate within an atmosphere containing the dopant element. The figure diagrammatically shows a case of utilizing an atmosphere containing P (phosphor).

The use of the invention disclosed in the present specification allows the inhomogeneity of effect in annealing a large area to be solved and the circuit comprising the thin film transistors to be formed homogeneously.

In particular, the dispersion of the laser oscillating position within the laser oscillator may be corrected and the dispersion (which occurs per each oscillation) of irradiation energy of the linear laser beam in the longitudinal direction may be corrected. Hence, the active matrix type liquid crystal display having no non-uniformity in the display may be obtained.

While preferred embodiments have been described, variations thereto will occur to those skilled in the art within the scope of the present inventive concepts which are delineated by the following claims.

What is claimed is:

1. A laser beam irradiation system, comprising:
   an oscillator having at least an oscillation space extending in one direction, a pair of electrodes interposing said oscillation space, and means for introducing gas connected to said oscillation space via a plurality of inlets located along said one direction uniformly, said oscillator outputting an excimer laser beam by applying a high voltage high-frequency wave between said electrodes; and
   an optical system having a plurality of lenses and homogenizers, said optical system shaping the laser beam from said oscillator into a linear laser beam having a cross section by expanding and condensing the laser beam in lengthwise and widthwise directions of the cross section, respectively,
   wherein said gas is homogeneously introduced in said one direction into said oscillation space thereby improving an evenness of an energy density in said lengthwise direction of the linear laser beam.

2. A system according to claim 1 wherein an energy density in said lengthwise and widthwise directions of said linear laser beam is homogeneous due to said plurality of lenses and homogenizers.

3. A system according to claim 1 wherein said cross section of said linear laser beam has a length of several tens centimeters and a width of several millimeters.

4. A system according to claim 1 further comprising a fan for agitating said gas in said oscillating space.

5. A laser beam irradiation system, comprising:
   an oscillator including a pair of electrodes and a gas supply element for supplying gas through a plurality of inlets therein uniformly to output an excimer laser beam in one direction by applying a high voltage high-frequency wave between said electrodes;
   an optical system having a plurality of lenses and homogenizers for shaping the excimer laser beam from said oscillator into a linear laser beam having a cross section by expanding and condensing the excimer laser beam in lengthwise and widthwise directions of the cross section, respectively,
   wherein said cross section of said linear laser has a length of several tens centimeters and a width of several millimeters.

6. A system according to claim 5 wherein an energy density in said lengthwise and widthwise directions of said linear laser beam is homogeneous due to said plurality of lenses and homogenizers.

7. A method according to claim 5 wherein said excimer laser is a KrF laser or a XeCl laser.

8. A system according to claim 5 further comprising a fan for agitating said gas in said oscillating space.

9. A laser beam irradiation system, comprising:
an oscillator having an oscillation space extending one direction, a pair of electrodes interposing said oscillation space, and means for introducing gas connected to said oscillation space via a plurality of inlets located along said one direction uniformly, said oscillator outputting an excimer laser beam by applying a high voltage high-frequency wave between said electrodes, and
an optical system having a plurality of lenses and homogenizers, said optical system shaping the laser beam from said oscillator into a linear laser beam having a cross section by expanding and condensing the laser beam in lengthwise and widthwise directions of the cross section, respectively,
wherein said gas is homogeneously introduced in the one direction into the oscillation space to uniformly generate discharge starting points in the one direction within said oscillation space.

10. A system according to claim 1 wherein an energy density in said lengthwise and widthwise directions of said linear laser beam is homogeneous due to said plurality of lenses and homogenizers.

11. A method according to claim 9 wherein said excimer laser is a KrF laser or a XeCl laser.

12. A system according to claim 9 wherein said cross section of said linear laser beam has a length of several tens centimeters and a width of several millimeters.

13. A system according to claim 9 further comprising a fan for agitating said gas in said oscillating space.

14. A laser beam irradiation system, comprising:
an oscillator having an oscillation space adapted to receive a gas supplied thereto uniformly to output an excimer laser beam in a direction by applying a high voltage high-frequency wave, the oscillator including a portion extending along the direction of travel of the excimer laser beam and a plurality of inlets for said gas arrayed in said direction of travel to uniformly generate discharge starting points in the direction of travel in the oscillator space when the gas is supplied uniformly therein and said high voltage high-frequency wave is applied thereto; and
an optical system having a plurality of lenses and homogenizers, said optical system shaping the excimer laser beam from said oscillator into a linear laser beam having a cross section by expanding and condensing the excimer laser beam in lengthwise and widthwise directions of the cross section, respectively.

15. A system according to claim 14 wherein an energy density in said lengthwise and widthwise directions of said linear laser beam is homogeneous due to said plurality of lenses and homogenizers.

16. A system according to claim 14 wherein said cross section of said linear laser beam has a length of several tens centimeters and a width of several millimeters.

17. A method according to claim 14, wherein said excimer laser is a KrF laser or a XeCl laser.

18. A system according to claim 14 further comprising a fan for agitating said gas in said oscillating space.

19. A laser beam irradiation system, comprising:
an oscillator having at least an oscillation space extending one direction, a pair of electrodes interposing said oscillator space, and means for introducing gas connected to said oscillation space via a plurality of inlets located uniformly along the one direction, said oscillator outputting an excimer laser beam by applying a high voltage high-frequency wave between the pair of electrodes; and
an optical system having a plurality of lenses and homogenizers, said optical system shaping the excimer laser beam from said oscillator into a linear laser beam having a cross section by expanding and condensing the excimer laser beam in lengthwise and widthwise directions of the cross section, respectively,
wherein a lengthwise energy density of the excimer laser is uniform due to the means for introducing gas, and an energy density in the lengthwise and widthwise directions of the linear laser beam is further homogenized by the optical system.

20. A system according to claim 19 wherein said excimer laser is a KrF laser or a XeCl laser.

21. A system according to claim 19 wherein said cross section of said linear laser beam has a length of several tens centimeters and a width of several millimeters.

22. A system according to claim 19 further comprising a fan for agitating said gas in said oscillating space.

23. A laser beam irradiation method comprising:
preparing a semiconductor thin film;
preparing an oscillator having a pair of electrodes and an oscillation portion extending one direction;
supplying a gas mixture uniformly to a plurality of locations in the oscillation portion in said oscillator;
generating an excimer laser beam from the oscillator using said gas mixture by applying a high voltage high-frequency wave to the pair of electrodes;
shaping the excimer laser beam from said oscillator into a linear laser beam; and
irradiating said semiconductor thin film with said linear laser beam, said semiconductor thin film being moved at a right angle to a length direction of a section of the linear laser beam during the irradiating.

24. A system according to claim 23 wherein said laser beam from the oscillator has a section of several cm square and said linear laser beam has a section of several tens cm in length and several mm in width.

25. A method according to claim 23 wherein the laser beam from the oscillator has no deviation of a distribution of a laser energy density.

26. The system according to claim 1, wherein said excimer laser is a KrF laser or a XeCl laser.

27. A method according to claim 26 wherein the laser beam from the oscillator has no deviation of a distribution of a laser energy density.

28. A method of irradiating with a laser beam, comprising the steps of:
preparing an oscillator and an optical system, said oscillator having a pair of electrodes, an oscillation space extending in one direction and a plurality of gas inlets disposed along the one direction;
introducing a gas mixture into said oscillation space;
discharging said gas mixture by applying a high voltage high-frequency wave to said electrodes, thereby a laser beam is emitted in the one direction from the oscillator;
shaping the laser beam from said oscillator into a linear laser beam using the optical system; and scanning a surface with said linear laser beam, wherein said gas mixture are introduced into said oscillation space via said plurality of inlets, and wherein a scanning direction is at right angles to a length direction of a section of said linear beam.

29. A method according to claim 28 wherein an energy density of said linear laser beam is homogeneous.

30. A method according to claim 28 wherein said laser beam from the oscillator has a section of several cm square and said linear laser beam has a section of several tens cm in length and several mm in width.

31. A method according to claim 28 wherein the laser beam from the oscillator has no deviation of a distribution of a laser energy density.

32. A method of fabricating a semiconductor device, comprising the steps of:

preparing a semiconductor film formed on a substrate having an insulating surface;

preparing an oscillator and an optical system, said oscillator having electrodes, an oscillation space extending in one direction, and a plurality of gas inlets disposed along the one direction;

introducing a gas mixture for generating a laser beam into said oscillation space;

generating a laser beam in the one direction from the laser oscillator;

shaping the laser beam into a linear laser beam by the optical system having a plurality of lenses and homogenizers; and scanning said semiconductor film with said linear laser beam, wherein said gas mixture is introduced into said oscillation space via a plurality of inlets uniformly disposed linearly at uniform intervals, and wherein a scanning direction is at right angles to a length direction of a section of said linear beam.

33. A method according to claim 32 wherein an energy density of said linear laser beam is homogeneous.

34. A method according to claim 32 wherein said laser beam from the oscillator has a section of several cm square and said linear laser beam has a section of several tens cm in length and several mm in width.

35. A method according to claim 32 wherein the laser beam from the oscillator has no deviation of a distribution of a laser energy density.

* * * * *

UNITED STATES PATENT AND TRADEMARK OFFICE
CERTIFICATE OF CORRECTION

PATENT NO. : 6,061,375  Page 1 of 1
DATED : May 9, 2000
INVENTOR(S) : Shunpei Yamazaki and Hongyong Zhang It is certified that error appears in the above-identified patent and that said Letters Patent is hereby corrected as shown below:

Please cancel claims 23-25 and 27-35.

Claim 10,
Line 1, change "claim 1" to read -- claim 9 --.

Signed and Sealed this

Twenty-fifth Day of December, 2001

Attest:

Attesting Officer

JAMES E. ROGAN
Director of the United States Patent and Trademark Office